Feb. 1, 1949.        N. VAN VOORHIS        2,460,662
BUILDING CONSTRUCTION
Filed May 1, 1945                            2 Sheets-Sheet 1
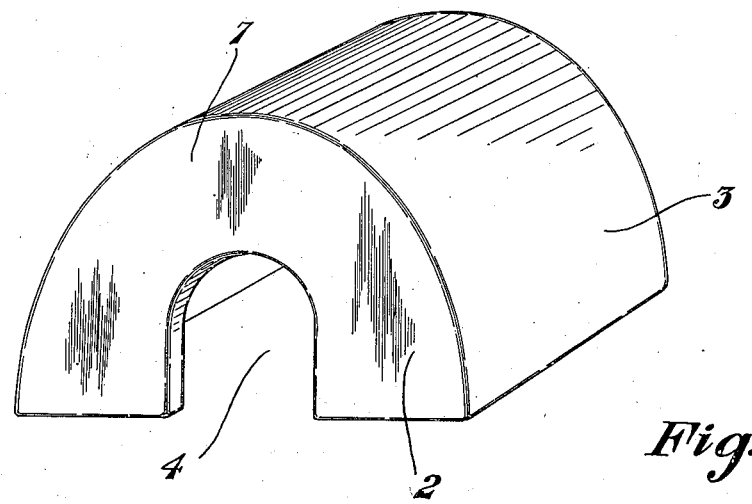
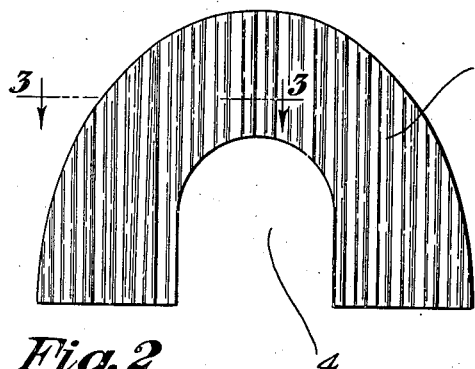
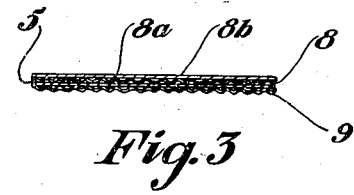
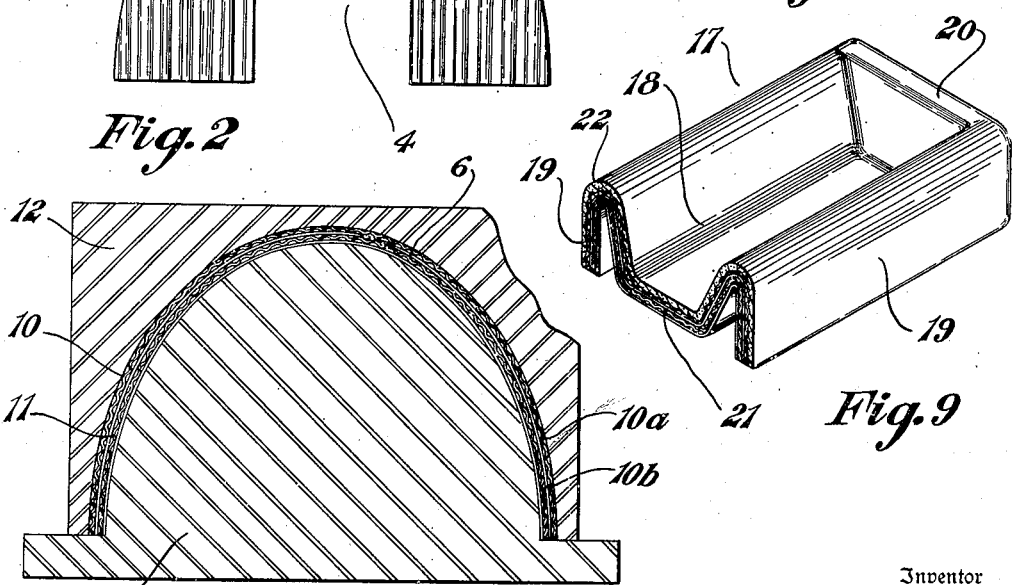
Inventor
Noble Van Voorhis
By Frease and Bishop
Attorneys Feb. 1, 1949. N. VAN VOORHIS 2,460,662
BUILDING CONSTRUCTION
Filed May 1, 1945 2 Sheets-Sheet 2
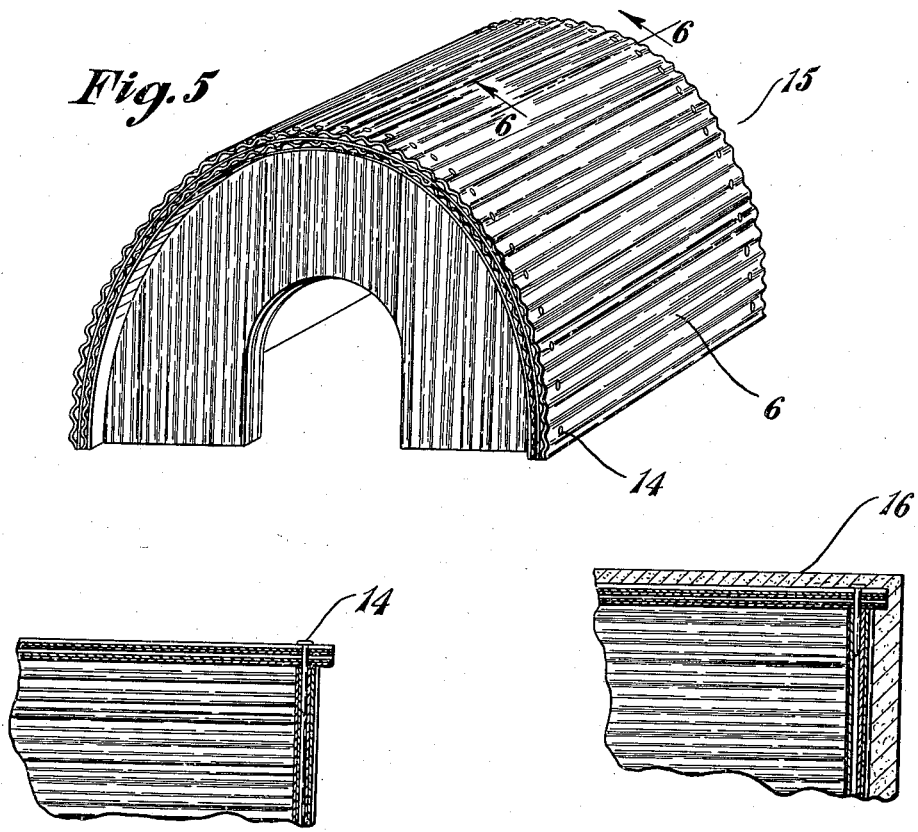
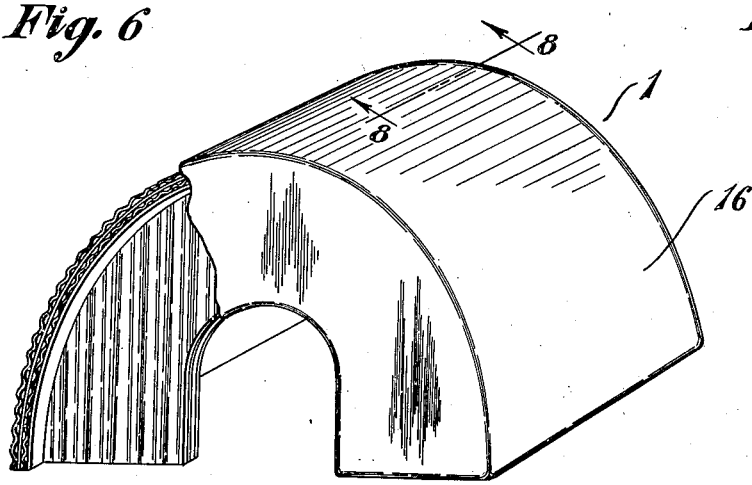
Inventor
Noble Van Voorhis
By Frease and Bishop
Attorneys Patented Feb. 1, 1949

2,460,662

UNITED STATES PATENT OFFICE 2,460,662

BUILDING CONSTRUCTION

Noble Van Voorhis, Canton, Ohio, assignor, by mesne assignments, of 76.89 per cent to R. E. MacKenzie and 23.11 per cent to L. V. Bockius Application May 1, 1945, Serial No. 591,325

1 Claim. (Cl. 72—1)

The invention relates to the construction of permanent concrete or cement buildings or structures such as chicken houses, hog pens, tool shed, milk cooling buildings, brooders, dog houses, watering troughs, and other similar types of buildings; and more particularly to a construction involving simple load sustaining forms for the concrete or cement which comprises an integral part of the finished structure.

Many types of miscellaneous small but permanent buildings are used on farms, but their construction has heretofore been time-consuming and expensive. Such buildings have usually been constructed of wood but this involves building a frame, including studs, stringers, rafters and the like, covering the frame with sheeting and the like in a weather-proof manner and then painting the structure to prevent deterioration. Concrete or cement structures are also made for such purposes but their construction again involves making inner and outer forms, usually of wood but sometimes of metal, between which concrete is poured to provide the walls and roof of the structure. After the concrete has been poured and has set, the forms are removed and the structure may be painted.

It is a primary object of the present invention to provide a new concrete or cement building construction in which the necessity of inner and outer forms is eliminated.

Furthermore, it is an object of the present invention to provide a new concrete or cement building construction which eliminates the use of expensive forms.

Also, it is an object of the present invention to provide a new building construction which eliminates the use of framing and finishing elements, such as wood studs, stringers, rafters and sheeting.

Moreover, it is an object of the present invention to provide a new concrete or cement building construction in which laminated, corrugated fiber board is used as a substantially rigid, load-bearing form, to which a coating of concrete or cement is applied, the corrugated board form comprising an integral part of the completed structure.

Furthermore, it is an object of the present invention to provide a concrete or cement building structure involving form members some of which have a curved or bent contour, and having corrugated surfaces with a concrete or cement coating applied and securely bonded thereto.

Furthermore, it is an object of the present invention to provide a concrete or cement building construction including laminated, corrugated members initially acting as a form for concrete or cement, to which concrete or cement is bonded; the laminated corrugated members comprising an integral part of the completed structure and providing thermal insulation for the completed structure.

Finally, it is an object of the present invention to provide a new concrete or cement building structure which is strong, insulated, and readily constructed in a simple and inexpensive manner.

These and other objects and advantages apparent to those skilled in the art from the following description and claim may be obtained, the stated results achieved, and the described difficulties overcome by the devices, constructions, arrangements, combinations, parts, elements, methods, and steps which comprise the present invention, the nature of which are set forth in the following general statements, preferred embodiments of which—illustrative of the best modes in which applicant has contemplated applying the principle—are set forth in the following description and shown in the drawings and which are particularly and distinctly pointed out and set forth in the appended claim forming part hereof.

The nature of the improvements in building construction of the present invention may be stated in general terms as including a plurality of laminated, corrugated, substantially rigid, fiber board, wall elements, at least the outer surface of each element being corrugated, certain of the elements preferably having a bent or curved contour, means securing the laminated fiber board elements together to provide a stable structural form, a coating of concrete or cement applied and bonded to the outer corrugated surfaces of the laminated form to provide a finished structure, and the laminated fiber board elements comprising an integral part of the walls of the finished structure and providing thermal insulation therefor.

The nature of the improvements in method of construction of the present invention may be stated in general terms as preferably including the steps of forming laminated, corrugated, fiber board, wall elements, imparting a permanent curved or bent shape or contour to certain of said elements, securing said elements together to provide a stable load-bearing form structure having corrugated exterior surfaces, and applying a coating of concrete, cement and the like, to and bonding it with the corrugated surfaces to form a strong, rigid, stable, insulated finished building structure.

By way of example, preferred embodiments of the present improvements in building construction are illustrated in the accompanying drawings forming part hereof, wherein:

Figure 1 is a perspective view of a completed building made in accordance with the present invention;

Fig. 2 is a side elevation of one wall form element for the structure illustrated in Fig. 1;

Fig. 3 is an enlarged section taken on the line 3—3, Fig. 2;

Fig. 4 is a section of another wall form element used in making the structure of Fig. 1, and illustrating the step of imparting a permanent curved contour thereto;

Fig. 5 is a perspective view similar to Fig. 1 illustrating the form elements of Figs. 2 and 4 secured together to provide a stable structure;

Fig. 6 is a fragmentary section taken as on the line 6—6, Fig. 5;

Fig. 7 is a view similar to Fig. 5 but illustrating the outer concrete or cement coating being applied;

Fig. 8 is a fragmentary section taken as on the line 8—8, Fig. 7; and

Fig. 9 is a perspective view, with parts broken away and in section, of another structure made in accordance with the present invention.

Similar numerals refer to similar parts throughout various figures of the drawings.

A finished building such as a dog house, chicken house or a hog house is indicated at 1 in Fig. 1 constructed in accordance with the present invention. The building 1 includes flat side walls 2 and a curved roof wall 3, one of the walls 2 being provided with a door opening 4.

The walls 2 and 3 of the structure 1 include laminated, corrugated, fiber board, side wall form elements 5 illustrated in Figs. 2 and 3, and a curved roof wall element 6, illustrated in Fig. 4, secured together to form a stable structure with an outer coating of concrete or cement 7 applied and bonded to the elements 5 and 6.

In fabricating the laminated side wall elements 5, a plurality of sheets of corrugated fiber board are glued together one on top of another. Two corrugated sheets 8 and 9 are illustrated in Fig. 3; but the laminated element 5 may be formed of any desired number of laminations to provide a wall element having the desired strength. As illustrated, the corrugations of each lamination 8 and 9 run in the same direction; but the corrugations of adjacent laminations may run at angles to one another if desired. After laminated sheets 8 and 9 of corrugated fiber board, each of which comprise corrugated sheets 8a and flat sheets 8b, are glued together with the desired number of and arrangement of laminations, the side wall elements 5 may be die cut to the desired shape or contour such as illustrated in Fig. 2. The rear side wall element is similar to the element 5 but may omit the door opening 4.

In fabricating the curved roof wall element 6, surfaces of a plurality of sheets of corrugated board 10 and 11 are coated with glue, and the corrugated board sheets 10 and 11 are superimposed one on top of another and placed in a mold, jig or die which may include female member 12 and male member 13 shaped to impart the desired contour to the element 6 as shown in Fig. 4. The jig elements 12 and 13 are pressed together to hold the corrugated sheets 10 and 11 in formed shape until the glue has set; after which curved element 6 is removed from the jig and it maintains its shape in a substantially rigid manner.

Two corrugated sheets 10 and 11 are illustrated in Fig. 4; but the laminated element 6 may be formed of any desired number of laminations with the corrugations running in the same or different directions to provide a laminated curved wall element having the desired strength. The sheets 10 and 11 of corrugated board which are glued together each comprise corrugated sheets 10a and initially flat sheets 10b.

The elements 5 and 6 may be assembled at the place of installation as illustrated in Figs. 5 and 6 to form a substantially rigid, self-sustaining, load-bearing structural form by securing the members 5 and 6 together by any suitable means. The securing means is illustrated as comprising nails 14, but mortise and tenon joints or tongue and groove joints may be formed between the members 5 and 6, or angle clips may be secured to each of the members to form joints therebetween.

In accordance with the present invention, a corrugated surface is presented on the exterior of all walls of the structure 15 formed by the assembly of laminated elements 5 and 6. If desired, corrugated surfaces may also be provided on the inner surfaces of laminated elements 5 and 6 but such provision is not necessary in order to accomplish the objects of the invention.

The assembled structure 15 of Fig. 5 as indicated, is rigid, and self-sustaining without using any framing elements, studs, rafters, etc., and provides a form for receiving concrete or cement as a coating. The step of applying a coating 16 of concrete or cement is illustrated in Figs. 7 and 8 wherein concrete or cement in a semi-liquid state may be sprayed or troweled onto the exterior corrugated surfaces of elements 5 and 6.

I have discovered that a substantial thickness of several inches of concrete or cement may be applied to the structure 15 and will adhere thereto and become bonded to the corrugated surfaces thereof. The concrete or cement sets rigidly, thus forming a permanent building that is thermally insulated on the inside by the corrugated board having air cells which keep out heat in the summer and cold in the winter.

If the inner surfaces of elements 5 and 6 are smooth, as shown, they may be finished by painting or by applying water-proofing material or fire-resistant material. Selectively, the inner surfaces of elements 5 and 6 may be corrugated surfaces to receive an inner coating of cement, plaster or other desired finishing material.

Alternately, instead of applying a coating of concrete or cement to either or both surfaces of the laminated corrugated board elements, a coating of plastic material may be applied to the surfaces thereof and permitted to set thus producing a rigid finished structure.

Although the corrugations of corrugated sheets 8a in side wall elements 5 are illustrated as extending vertically, these corrugations may extend horizontally if desired to assist in retaining the concrete coating 16 while it is setting.

Another form of building is illustrated in Fig. 9, such as a watering trough 17, including a trough portion 18, side walls 19 and end walls 20. The trough 17 is constructed in the same manner as the building of Fig. 1 by using a laminated curved, corrugated board, trough forming element 21 to which a laminated end wall element is secured. A coating of concrete or cement 22 is then applied to the corrugated laminated elements to form the completed trough structure.

Accordingly, the present invention provides a new building structure which eliminates the use of expensive forms, which eliminates the use of inner and outer forms for a concrete structure, which eliminates the use of wood framing elements, and which provides a cheap, durable and easily constructed building having laminated corrugated board wall elements coated with concrete, cement or plastic bonded to corrugated surfaces of the wall elements.

In the foregoing description, certain terms have been used for brevity, clearness and understanding; but no unnecessary limitations are to be implied therefrom beyond the requirements of the prior art, because such words are utilized for descriptive purposes herein and not for the purpose of limitation and are intended to be broadly construed. Thus, when the term "concrete" is used herein and in the appended claim, that term is intended to include a coating of concrete, cement, plastic, or other material which may be applied and bonded to the laminated corrugated board wall elements to form a rigid structure.

Moreover, the embodiments of the improved construction illustrated and described are by way of example, and the scope of the present invention is not limited to the exact details of construction of the various parts.

Having now described the features of the invention, the construction, operation and use of preferred embodiments thereof, and the advantageous, new and useful results obtained thereby; the new and useful devices, constructions, arrangements, combinations, parts, elements, methods, and steps, and reasonable mechanical equivalents thereof obvious to those skilled in the art, are set forth in the appended claim.

I claim:

A rigid concrete structure including two end wall elements and a curved roof wall element, each element being formed of laminated corrugated board, each corrugated board lamination comprising a corrugated and a flat sheet, means adhesively securing the laminations rigidly together throughout their contacting surfaces to maintain a predetermined shape, at least the outer surface of each wall element being corrugated, means securing the end and curved roof wall elements together to provide a stable structural form, a coating of concrete applied and bonded to the outer corrugated surfaces of the laminated form, and the laminated corrugated board elements comprising an integral part of and thermal insulation for the walls of the finished structure.

NOBLE VAN VOORHIS.

REFERENCES CITED

The following references are of record in the file of this patent:

UNITED STATES PATENTS

| Number | Name | Date |
| --- | --- | --- |
| 145,181 | Hyatt | Dec. 2, 1873 |
| 704,771 | Bailey | July 15, 1902 |
| 1,076,725 | Weakley | Oct. 28, 1913 |
| 1,179,773 | Smith | Apr. 18, 1916 |
| 1,337,254 | Muench | Apr. 20, 1920 |
| 2,216,206 | McKee, Jr. | Oct. 1, 1940 |

FOREIGN PATENTS

| Number | Country | Date |
| --- | --- | --- |
| 37,279 | Norway | July 2, 1923 |
| 125,999 | Austria | Dec. 28, 1931 |
| 628,814 | Germany | 1936 |